June 23, 1964 W. W. MOE 3,138,662

DIRECT POSITIVE PRINTER FOR COLOR PRINT ANALYZER

Filed Feb. 28, 1962 2 Sheets-Sheet 1

INVENTOR
WILLIAM WEST MOE

BY
Brumbaugh, Free, Graves & Donohue
his ATTORNEYS

June 23, 1964 W. W. MOE 3,138,662

DIRECT POSITIVE PRINTER FOR COLOR PRINT ANALYZER

Filed Feb. 28, 1962 2 Sheets-Sheet 2

INVENTOR.
WILLIAM WEST MOE

BY Brumbaugh, Free, Graves & Donohue
his ATTORNEYS

United States Patent Office 3,138,662

Patented June 23, 1964

3,138,662
DIRECT POSITIVE PRINTER FOR COLOR PRINT ANALYZER

William West Moe, Stratford, Conn., assignor to Time, Incorporated, New York, N.Y., a corporation of New York Filed Feb. 28, 1962, Ser. No. 176,244
13 Claims. (Cl. 178—5.2)

Figure 1:
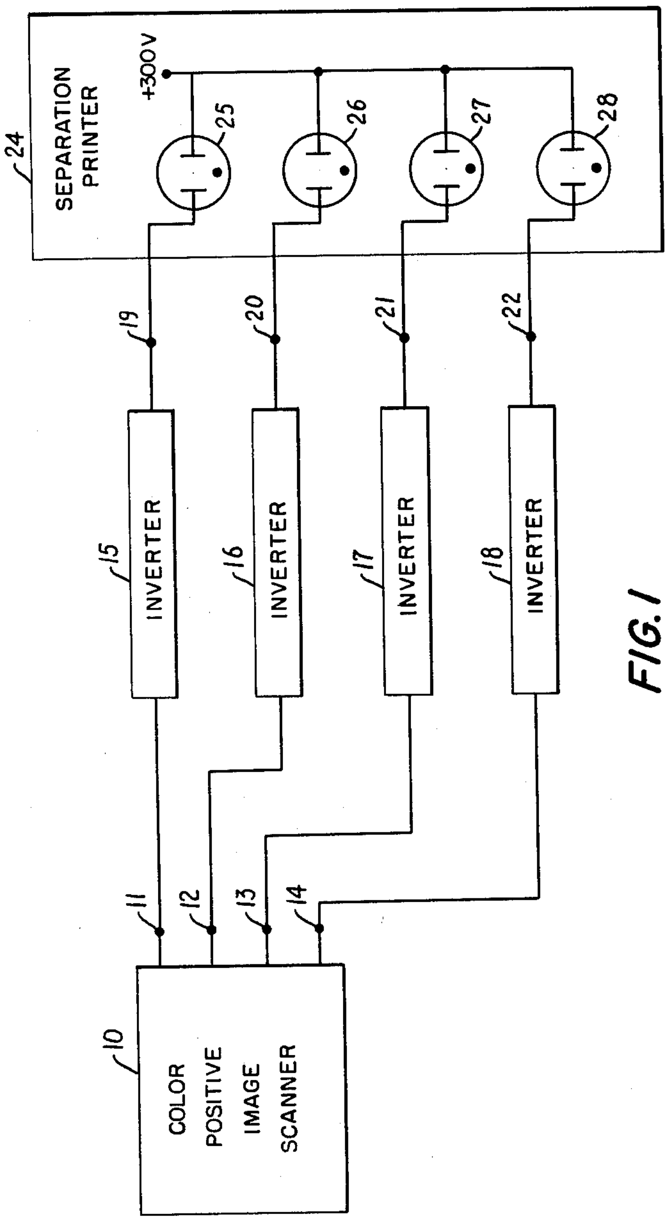

This invention relates to analyzers for producing color separation images from a color film and, more particularly, to a new and improved color film analyzer arranged to provide positive color separation images directly from a positive color film.

In the reproduction of a colored image using various inks of different color, separate images each representing one of the primary colors in the original color image must be made in order to prepare corresponding halftone printing plates. Ordinarily, these color separation images are made by scanning the original image, which is usually a positive film transparency, point by point, through color filters and modulating the intensity of three corresponding film printing light sources in direct relation to the light transmitted by the three filters so as to produce three separate negative film images representing the occurrence and intensity of the primary colors at corresponding locations in the original. Frequently, another negative image known as a "black printer" is also prepared in a similar manner to apply an appropriate black ink image to the final color print.

Various processes may be used to prepare printing plates from the three color separation prints and the black printer, but in some of these processes, the starting point must be a group of positive separation images rather than the negative images produced in the above manner. Ordinarily, this requires positive film prints to be made from each of the negatives, and this not only involves additional time and expense but also introduces unavoidable variations in the tone scales of the separation images.

Accordingly, it is an object of this invention to provide a new and improved system for producing positive separation images directly from a scanned positive color image.

Another object of the invention is to provide a new and improved system for producing positive separation images from a scanned color positive wherein any necessary corrections in the tone scales of the images can be made during the preparation of the separation prints.

A further object of the invention is to provide a new and improved tone scale inverter for use in a system of the above character.

These and other objects of the invention are accomplished by providing in each of the color image information signal channels of a color film analyzer and separation printer system, an inverter arranged to invert the exposure light signal with respect to the electrical signal representing the color intensity at each point in the original color image. Preferably, the inverters each include automatically variable impedance means, such as varistor networks, selected to impart to the signals any necessary corrections to produce the proper color tone scales in the finished print. In a particular embodiment, the inverter comprises electron valve means, such as a transistor, connected in shunt with a film exposing light source, such as a glow lamp, so as to reduce the intensity of the glow lamp output in response to an increase in the voltage of an input signal which is applied to the inverter. In this case, the automatically variable impedance means is preferably connected so as to vary the inverter response in the desired manner as the input signal changes.

Figure 2:
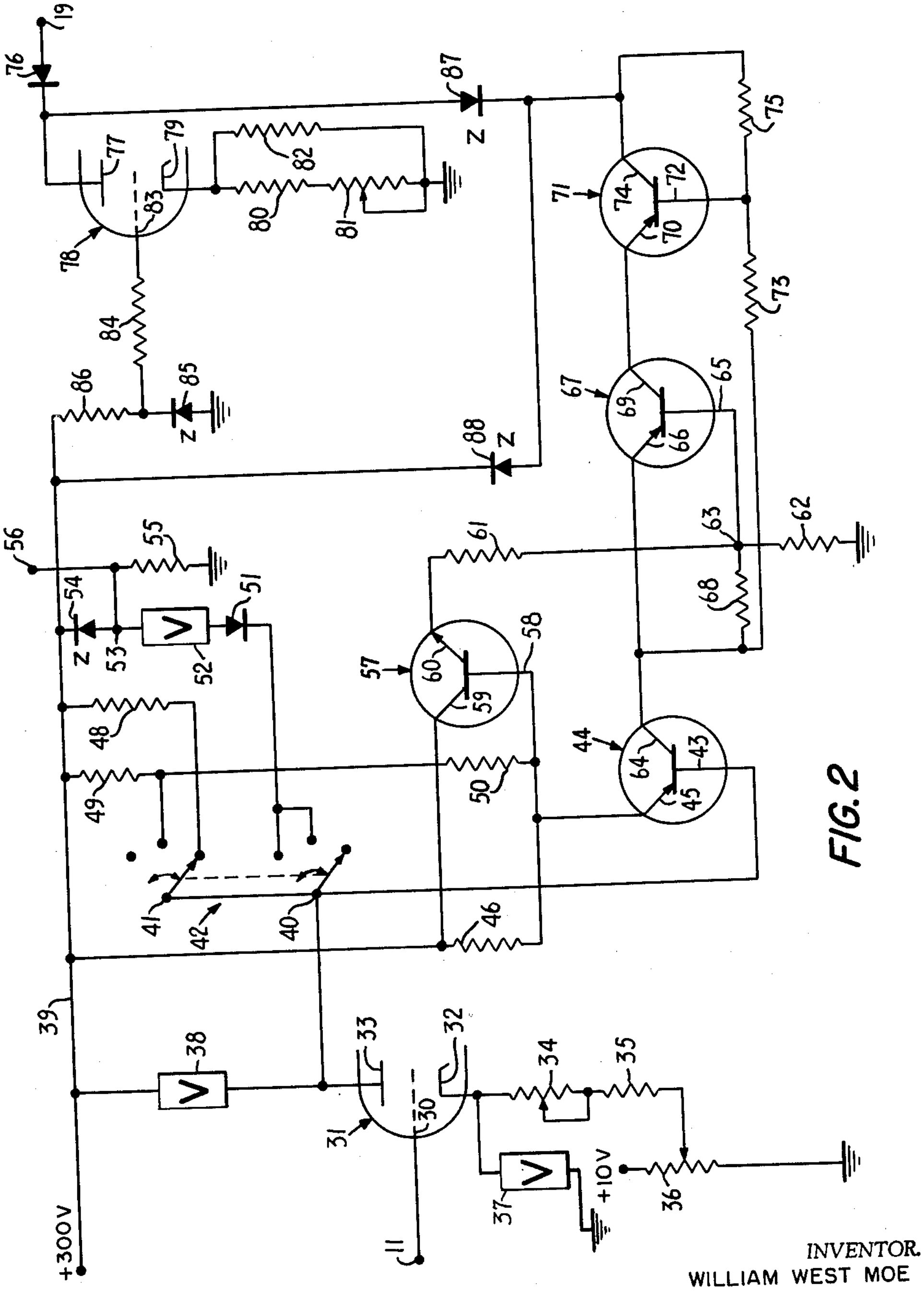

Further objects and advantages of the invention will be apparent from a reading of the following description in conjunction with the accompanying drawings, in which:

FIG. 1 is a schematic block diagram illustrating the arrangement of a representative form of color image analyzer arranged for direct positive printing according to the invention; and FIG. 2 is a schematic circuit digaram showing a typical inverter arranged in accordance with the present invention.

In the block diagram shown in FIG. 1, a conventional color image scanner 10 is arranged in the usual manner to scan a positive color transparency, point by point, with a beam of light and to produce at four terminals 11, 12, 13 and 14, electrical signals which instantaneously represent the intensity of each of the three primary colors at the point being scanned along with the necessary "black printer" intensity which can either be obtained optically or derived electrically in the manner described, for example, in the United States patent to Hall, No. 2,892,016. Acording to the present invention, four tone scale inverters 15, 16, 17 and 18 are connected between the terminals 11–14 and four further terminals 19, 20, 21 and 22, respectively, which comprise inputs to a separation image printer 24 of the usual type, so as to control the intensities of four glow lamps 25, 26, 27 and 28, respectively. As in a conventional printer, the glow lamps 25–28 are arranged to expose corresponding pieces of photosensitive material according to the electrical signals received so as to produce color separation images, the pieces of photosensitive material being moved in conjunction with the color transparency in the scanner 10. It will be understood that, if desired, the system of the present invention may be used without alteration except for any necessary tone scale adjustments to produce negative separation images from an original negative color image rather than positive separations from a positive transparency.

For convenience, only one of the inverters 15–18 is illustrated in detail in FIG. 2, the others being identical in arrangement but, if necessary, having slightly different settings of the automatically variable impedance to produce the necessary tone scale curve for the corresponding colored ink. In FIG. 2, which represents the inverter 15 of FIG. 1, the corresponding electrical signal from the scanner which is received at the terminal 11 passes to the control grid 30 of an input amplifier 31 which may, for example, comprise one-half of a dual vacuum tube of the type designated 5751, having a cathode electrode 32 and a plate electrode 33. Preferably, the other half of the dual tube 31 is used for the same purpose in one of the other inverters 16–18. Cathode bias is supplied to this amplifier through a series rheostat 34 and resistor 35 leading to an adjustable tap on a voltage divider resistor 36 which is connected to ground. In addition, the cathode bias circuit shown in FIG. 2 is shunted by an automatically variable impedance network 37, while the plate electrode 33 is joined through a similar variable impedance network 38 to a 300 volt positive line 39 but, in some instances, only one of these automatically variable networks will be necessary.

The two variable impedance networks 37 and 38 preferably comprise one or more non-linear circuit components, such as thyrite resistors, which decrease in resistance in a predetermined manner as the applied voltage increases. The components in these networks are selected and arranged to generate a potential at the plate 33 which varies in a desired manner with the applied signal at the terminal 11 so that it will produce at the inverter output terminal 19 a signal adapted to control the intensity of the glow lamp 25 in the manner necessary to produce the desired tone scale for the corresponding color in the finished print. The exact circuit arrangement of the networks 37 and 38 can readily be determined from the desired final image characteristics by well-known methods and, in certain cases, a single thyrite resistor of selected characteristics will be sufficient, either with or without a linear resistance component connected in series or parallel therewith, while in other cases, more complex arrangements of several series and parallel connected thyrite resistors and linear resistors may be required. A typical example of an automatically variable impedance network adapted to be utilized in a signal compression circuit is described in detail in the United States patent to Moe, No. 2,517,586.

From the plate 33, the signal is carried to both of the common terminals 40 and 41 of a double pole three-position switch 42 and to the base electrode 43 of a PNP type transistor 44 which has an emitter electrode connected to the positive line 39 through a resistor 46. This transistor may, for example, be of the type designated 2N526. In order to permit adjustment of the system for differences in original image characteristics, variations in printing processes, or the like the switch 42 is adapted to provide any of three different types of response to input signal variations and, to this end, the switch, in the illustrated position, connects the base electrode 43 to the 300 volt positive line 39 through a resistor 48 and the terminal 41, the other common terminal being inactive in this switch position. In the middle switch position as shown in the drawings, the base electrode of the transistor 44 is connected, by the terminal 41, to the positive line through a similar resistor 49 and also to the emitter electrode 45 of the same transistor through a resistor 50 while the common terminal 40 connects the base electrode through a diode rectifier 51 oriented in the low resistance direction to another automatically variable impedance network 52. This variable impedance network also includes one or more non-linear circuit components of the type described above with respect to the networks 37 and 38, and is arranged in a manner similar to those networks to further modify the relation between the input signal and the signal at the plate 33 in a selected manner when the switch 42 is at either of the middle and upper illustrated positions, the common terminal 41 being inactive when the switch is in the upper position. The other end of the network 52 is connected to the junction 53 between a grounded 5.1 volt zener type diode 54 and a resistor 55 connected to the positive line 39, thereby providing a voltage which is fixed with respect to the positive line voltage and, if desired, this voltage may be taken off at a terminal 56 for similar use in the other inverters 16–18.

Another transistor 57, such as a NPN transistor of the type designated 2N1304, is arranged as an emitter follower with a base electrode 58 connected to the emitter 45 of the transistor 44, and a collector electrode 59 joined to the positive voltage line. This transistor also includes an emitter electrode 60 connected through two voltage divider series resistors 61 and 62 to ground, so as to provide a substantially constant one volt drop across the resistor 61. The voltage at the junction 63 between the resistors 61 and 62 is supplied to the emitter electrode 64 of the transistor 44 through the collector 65 and the emitter 66 of another 2N526 transistor 67, a resistor 68 being inserted between the junction 63 and the emitter 66 to protect the transistor 67 from accidental reverse voltage surges. The collector electrode 69 of the transistor 67 leads to the emitter electrode 70 of a third 2N526 transistor 71 which has a base electrode 72 joined through a resistor 73 to the collector 64 of the transistor 44 and a collector electrode 74 connected through a similar resistor 75 to the base electrode 72.

As illustrated in FIG. 1, one side of the glow lamp 25 is connected to the positive voltage source and the other side is joined to the terminal 19. In order to provide easy adjustment of the maximum glow lamp current, which will be independent of variations in the 300 volt supply, the terminal 19 is connected, as shown in FIG. 2, through a diode 76 to an impedance circuit comprising a triode 78 having its plate electrode 77 connected to the diode 76 and its cathode electrode 79 joined to ground through a series resistor 80 and rheostat 81 and a parallel resistor 82. The triode 77 which may, for example, be one-half of a dual tube of the 5965 type, includes a control grid electrode 83 connected through a resistor 84 to the junction between a grounded 10M75Z zener diode 85 and a resistor 86 leading to the positive line 39 so as to hold the grid at a fixed potential of 75 volts.

To modulate the intensity of the glow lamp in inverse relation to the amplitude of a signal applied to the input terminal 11, the collector electrode 74 is joined to the plate electrode 77 through a 1.5M56Z zener diode 87, thereby placing the three series transistors 44, 67, and 71 in shunt with the glow lamp through the resistor 46, the shunt current being controlled by the magnitude of the signal applied to the base electrode 43. The diode 87 is utilized to reduce the operating voltage of the transistors, thereby decreasing their power dissipation. In order to protect the transistors from excess voltage in case the glow lamp is accidentally disconnected, another zener diode 88 of the 10M56Z type is connected in the reverse direction between the collector 74 and the positive voltage line 39.

In a typical inverter circuit designed for use with a glow lamp drawing a maximum of about 10 milliamperes current and having a voltage drop of about 80 to 110 volts, the various resistors had the following values to produce the operation described below:

| | Ohms | | Ohms |
|---|---|---|---|
| Resistor **34** | 100,000 | Resistor **62** | 150,000 |
| Resistor **35** | 47,000 | Resistor **68** | 12,000 |
| Resistor **36** | 5,000 | Resistor **73** | 27,000 |
| Resistor **46** | 950 | Resistor **75** | 27,000 |
| Resistor **48** | 120,000 | Resistor **80** | 12,000 |
| Resistor **49** | 120,000 | Resistor **81** | 10,000 |
| Resistor **50** | 2,200 | Resistor **82** | 15,000 |
| Resistor **55** | 150,000 | Resistor **84** | 1,000 |
| Resistor **61** | 560 | Resistor **86** | 120,000 |

In operation, an electrical signal from the scanner 10 which is increasingly positive with increasing brightness of one of the colors in the scanner image, is applied to the terminal 11. Inversion of this signal by the tube 31 produces at the plate electrode 33 and at the base electrode 43 of the transistor 44, an increasingly negative signal, the relation between this signal and the input signal having been adjusted by the variable impedance networks 37, 38 and 52, and selected by the switch 42 in accordance with the desired tone scale in the finished print. As the potential at the base electrode 43 becomes more negative, more current is permitted to flow through the three transistors 44, 67 and 71 and the resistor 46. As a result of this increase in current through the transistor shunt circuit, proportionately less current is drawn by the glow lamp through the terminal 19, thereby reducing the intensity of its light output and producing less exposure on the corresponding position of the photosensitive material so that, when developed, the resulting image will appear brighter with increasingly positive input signals at the terminal 11.

During this process, the emitter follower transistor 57 maintains the voltage drop across the transistor 44 at about one volt and the difference between the remaining voltage drop across the glow lamp and the voltage across the resistor 46 and the zener diode 87 is divided evenly between the transistors 67 and 71. Thus, where the total transistor voltage drop is about ten volts, the voltage across each of the transistors 67 and 71 is about four and one-half volts and with a transistor voltage drop of 40 volts, which is about the maximum to be expected with the usual type of glow lamp, these transistors each have a voltage drop of only about 19.5 volts. Consequently, even under the maximum voltage conditions, the control transistor 44 is not subjected to a large enough potential to cause appreciable heating or leakage current. Moreover, it will be noted that the transistor circuit is highly degenerative since the voltage developed across the resistor 46 is maintained approximately equal to the control voltage at the base electrode 43. In this way, the control transistor is used only to match the current in the transistor circuit with the control signal and the transistor circuit operation is relatively independent of variations in control transistor characteristics.

As previously mentioned, the other inverters 16, 17 and 18 are similar to that shown in FIG. 2 and operate in the same manner so that the four glow lamps 25–28 produce four positive separation images on four different pieces of film which are preferably moved simultaneously in conjunction with the original positive image in the scanner 10.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. A tone scale inverter for controlling the intensity of a light source in response to an electrical signal so as to produce a decrease in the light intensity from the source in response to increasing potential of the electrical signal comprising impedance means adapted to be connected in series with the light source between first and second voltage points, the impedance means being connected to the second voltage point, transistor circuit means having a junction point with the impedance means and connected in series with the impedance means between the second voltage point and a third voltage point, the voltage of which differs from that of the junction point in the same direction as the difference between the first voltage point and the junction point, and input means for applying electrical control signals to the electron valve means so as to increase the current drawn thereby in response to increasing input signal potential.

2. A tone scale inverter according to claim 1, wherein the input means includes non-linear impedance means arranged to vary the response of the inverter to control signals in a selected manner to introduce a desired variation in the tone scale of the light produced by the light source.

3. A tone scale inverter for controlling the intensity of a light source in response to an electrical signal so as to produce a decrease in the light intensity from the source in response to increasing potential of the electrical signal comprising impedance means adapted to be connected in series with the light source between first and second voltage points, the impedance means being connected to the second voltage point, electron valve means having a junction point with the impedance means and connected in series with the impedance means between the second voltage point and a third voltage point, the voltage of which differs from that of the junction point in the same direction as the difference between the first voltage point and the junction point, and input means for applying electrical control signals to the electron valve means so as to increase the current drawn thereby in response to increasing input signal potential, wherein the input means includes non-linear impedance means arranged to vary the response of the inverter to control signals in a selected manner to introduce a desired variation in the tone scale of the light produced by the light source, wherein the non-linear impedance means includes a plurality of circuit components and switch means for selectively connecting certain of the elements in circuit with the input means to introduce one of several predetermined variations in the tone scale of the light produced by the light source.

4. A tone scale inverter according to claim 2 wherein the input means includes vacuum tube means having grid electrode means to receive the control signals and plate electrode means connected to control the electron valve means and wherein the non-linear impedance means is connected as a plate load for the vacuum tube means.

5. A tone scale inverter for controlling the intensity of a light source in response to an electrical signal so as to produce a decrease in the light intensity from the source in response to increasing potential of the electrical signal comprising impedance means adapted to be connected in series with the light source between first and second voltage points, the impedance means being connected to the second voltage point, electron valve means having a junction point with the impedance means and connected in series with the impedance means between the second voltage point and a third voltage point, the voltage of which differs from that of the junction point in the same direction as the difference between the first voltage point and the junction point, and input means for applying electrical control signals to the electron valve means so as to increase the current drawn thereby in response to increasing input signal potential, wherein the input means includes non-linear impedance means arranged to vary the response of the inverter to control signals in a selected manner to introduce a desired variation in the tone scale of the light produced by the light source, wherein the input means includes vacuum tube means having grid electrode means to receive the control signals, plate electrode means connected to control the electron valve means, and cathode electrode means and wherein the non-linear impedance means is connected in circuit with the cathode electrode means to provide an automatically variable bias thereto.

6. A tone scale inverter according to claim 1 wherein the transistor circuit means comprises a plurality of transistor means connected in series.

7. A tone scale inverter according to claim 6 including zener diode means connected in series with the transistor means and the impedance means to reduce the voltage drop across the transistor means.

8. A tone scale inverter according to claim 6 wherein one of the transistor means comprises a control transistor and including means for maintaining a low voltage drop across the control transistor to prevent instability thereof due to heating.

9. A tone scale inverter according to claim 8 wherein the means for maintaining a low voltage comprises voltage divider means and emitter follower transistor means connected in series with a portion of the voltage divider means across the control transistor.

10. A tone scale inverter according to claim 6 including zener diode means connected across the plurality of transistor means to prevent overloading thereof.

11. A tone scale inverter according to claim 1 including additional impedance means connected in series with the transistor circuit means so as to provide a degenerative circuit wherein the control signal is matched against the signal developed by the additional impedance means.

12. A separation image printer comprising scanner means for scanning an original color image to produce a plurality of electrical signals representing the occurrence and intensity of a plurality of colors in the image in direct relation to the intensities of the colors, printing means including a corresponding plurality of light source means for printing separation images representing the various colors, and a plurality of inverter means each connected to receive one of the electrical signals and to control the intensity of corresponding light source, each inverter means comprising impedance means connected in series with the light source between first and second voltage points, the impedance means being connected to the second voltage point, electron valve circuit means having a junction point with the impedance means and connected in series with the impedance means between the second voltage point and a third voltage point, the voltage of which differs from that of the junction point in the same direction as the difference between the first voltage point and the junction point, and input means for applying the received electrical signals to the electron valve means so as to increase the current drawn thereby in response to increasing input signal potential.

13. A separation image printer according to claim 12 wherein each inverter means includes non-linear impedance means connected to vary the response of the inverter to control signals in a selected manner to introduce a desired variation in the tone scale of the light produced by the light source.

References Cited in the file of this patent

UNITED STATES PATENTS

| | | |
|---|---|---|
| 2,146,818 | Hahnle | Feb. 14, 1939 |
| 2,356,195 | Balsley | Aug. 22, 1944 |